Figure 1:
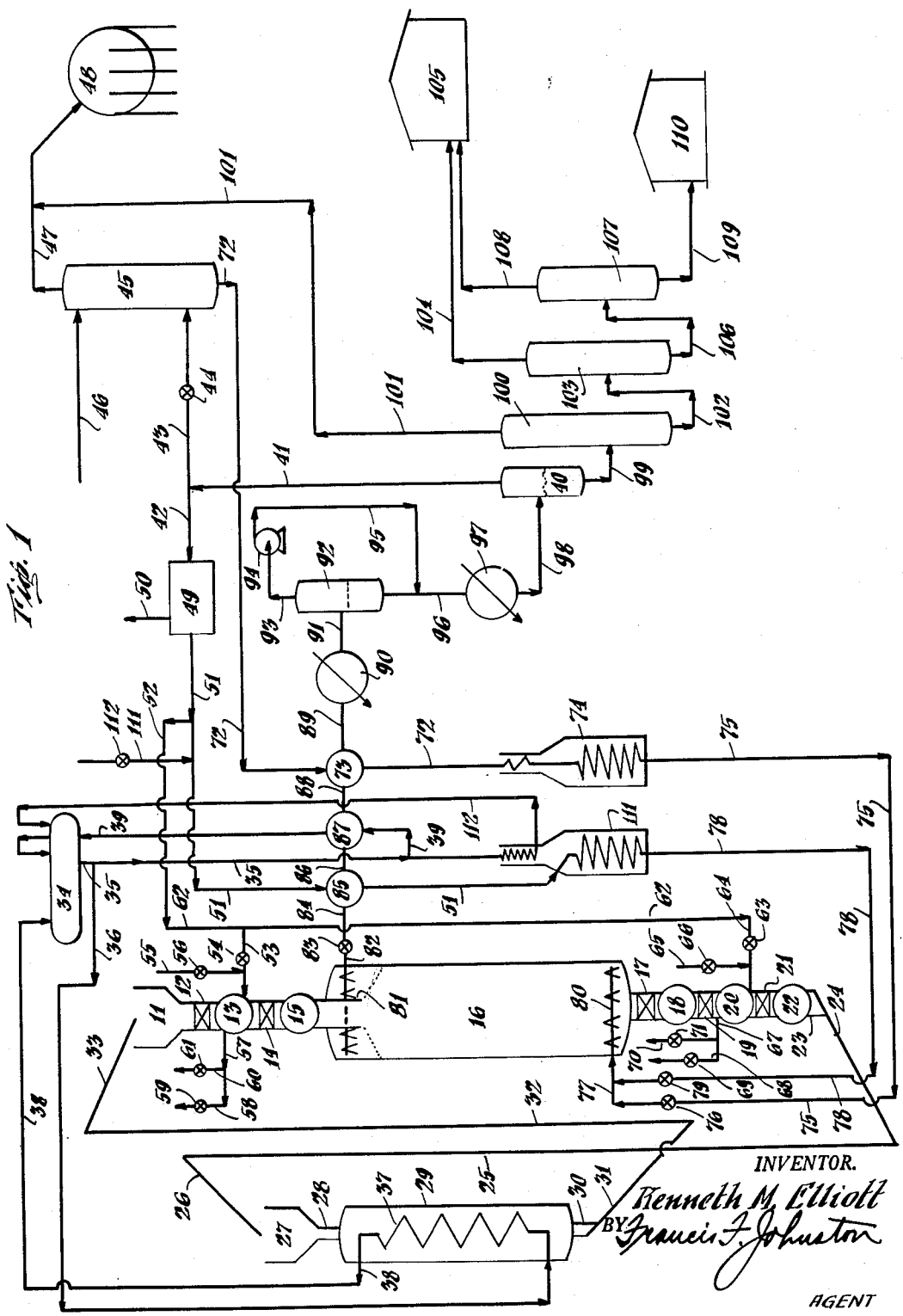

July 24, 1956  K. M. ELLIOTT  2,756,190
REFORMING IN THE PRESENCE OF CARBON MONOXIDE
Filed Jan. 29, 1953  3 Sheets-Sheet 1

INVENTOR.
Kenneth M. Elliott
BY Francis F. Johnston
AGENT

July 24, 1956  K. M. ELLIOTT  2,756,190
REFORMING IN THE PRESENCE OF CARBON MONOXIDE
Filed Jan. 29, 1953  3 Sheets-Sheet 2

INVENTOR.
Kenneth M. Elliott
BY Francis F. Johnston
AGENT

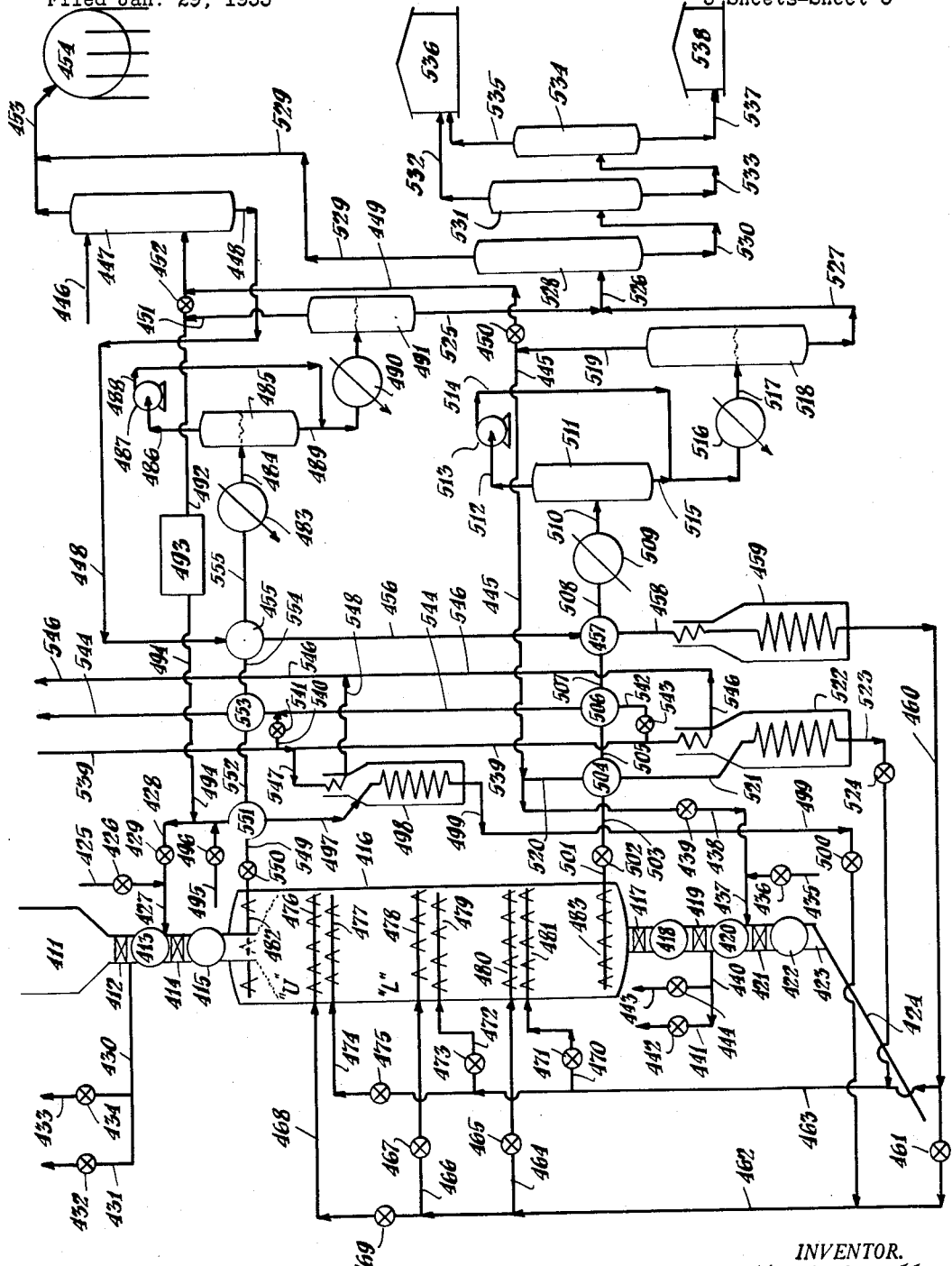

United States Patent Office 2,756,190
Patented July 24, 1956

2,756,190

REFORMING IN THE PRESENCE OF CARBON MONOXIDE

Kenneth M. Elliott, Woodbury, N. J., assignor to Socony Mobil Oil Company, Inc., a corporation of New York Application January 29, 1953, Serial No. 333,901

4 Claims. (Cl. 196—50)

The present invention relates to the reforming of mixtures of hydrocarbons in the presence of a reforming catalyst and, more particularly, to a method of reforming mixtures of hydrocarbons in the presence of carbon monoxide.

Reforming is the characterization of that treatment of mixtures of hydrocarbons in which at least some of the hydrocarbons of the mixture undergo one or more of the molecular changes, isomerization, hydrogenation, dehydrogenation and dehydrocyclization. While such molecular changes can take place in the absence of a known catalyst and such changes are termed thermal reforming, the present invention is related to processes in which such changes take place in the presence of a solid catalyst and particularly in the presence of a moving substantially compact column of particle form solid catalysts which are at least partially deactivated during the reaction and are reactivated by combustion of a deactivating carbonaceous deposit, designated as coke, in the presence of an oxygen-containing gas, such as air.

There are many solid reforming catalysts available to the art in particle form, any of which are useful in catalytic reforming and in the present process. Usually these catalysts comprise one or more metals or metal oxides alone or associated with suitable relatively inert or inert carriers.

In general, catalytic reforming of mixtures of hydrocarbons such as petroleum naphtha comprises contacting a particle form solid reforming catalyst with a mixture of hydrocarbons such as petroleum naphtha whereby is included gasoline of relatively low octane rating in the presence of a gaseous heat carrier which can contain hydrogen or which can be substantially devoid of hydrogen at reaction temperatures of 800° to about 1100° F., at a reaction pressure of atmospheric or super-atmospheric pressure up to about 600 p. s. i. a. During the reaction a carbonaceous deposit is laid down on the catalyst. This deposit deactivates the catalyst requiring reactivation. Reactivation is achieved by burning the coke in the presence of a gas containing free oxygen such as air.

The reactivation of such reforming catalysts by combustion of the coke in the presence of a gas containing free oxygen such as air while accomplishing that purpose puts the catalyst in a condition such that untreated fresh or regenerated catalyst produces lower yields of reformate than when the fresh or regenerated catalyst is treated as described in the prior art.

It has been observed that with untreated catalyst, the effluent from the reformer or reactor has a greater concentration of water than the reactants, i. e., mixture of hydrocarbon plus gaseous heat carrier. Whether this water is present as moisture on the catalyst entering the reactor or is due to a reaction between oxygen compounds present in the untreated fresh or regnerated catalyst and gaseous and/or vaporous components of the reactor has not been indisputably determined. However, it has been determined that several expedients can be employed to increase the yield of reformate.

For example, the prior investigators have found that treatment with hydrogen before contacting the catalyst with reactant results in an increased yield. In a copending application Serial No. 285,484 filed May 1, 1952 in the name of the present applicant, Kenneth M. Elliott, a method of increasing the yield of reformate without prior treatment with hydrogen is disclosed. In U. S. Patent No. 2,500,482 issued to Cyril Barter, March 14, 1950, a third method of increasing the yield of reformate is disclosed. This method of increasing the yield of reformate is of particular interest in that it involves the use of carbon monoxide under certain conditions.

The patentee's method essentially requires saturation of the catalyst with carbon monoxide before contacting the catalyst with the reactant. The patentee emphasizes that, when carbon monoxide is added to the gaseous reactants and the catalyst contacted with the mixture of hydrocarbon and carbon monoxide without previous saturation of the catalyst with carbon monoxide, the added carbon monoxide did not exert any beneficial effect. The patentee also states that the carbon monoxide may contain a minor amount of carbon dioxide or nitrogen or any other material which is less strongly absorbed than carbon monoxide but the patentee cautions that such materials as hydrogen and water vapor which are more strongly absorbed than carbon monoxide should not be present in any substantial amount. The patentee sets the limit for water as not more than 3% and preferably less than 2% water vapor in the carbon monoxide. With respect to permissible concentrations of hydrogen the patentee states that the use of any appreciable pressure of added hydrogen is not recommended and that the partial pressure of added hydrogen should be less than one atmosphere. In contrast to the foregoing, it has now been discovered that carbon monoxide added to reactant mixture is effective to produce higher yields of reformate without saturation of the catalyst prior to contact with the reactant. It has also been discovered that at hydrogen partial pressures greater than one atmosphere increased yields of reformate are obtained. No explanation for the diversity of results can be offered at this time.

The reforming method of the present invention can be used in conjunction with situ beds of catalyst or with circulating catalyst such as moving substantially compact columns of particle form catalyst. The reaction temperature is about 850° to about 1080° F. preferably about 960° to about 1060° F. The reaction pressure is from atmospheric to about 600 p. s. i. a. preferably about 100 to about 300 p. s. i. a.

The mixture of hydrocarbons to be reformed is one which either is wholly formed of hydrocarbons capable of any or all of the molecular changes, isomerization, hydrogenation, dehydrogenation, and dehydrocyclization or a mixture containing sufficient hydrocarbons capable of undergoing any or all of the aforesaid molecular changes that the resulting reformate, i. e., material boiling in the gasoline range, has an octane rating appreciably higher than that of the charge stock.

The gaseous heat carrier is a gas containing less than 25% hydrogen or containing more than 25% hydrogen, for example pure hydrogen, and preferably containing about 30 to about 65% hydrogen balance $C_1$ to $C_6$ hydrocarbons, such as recycle gas.

The gaseous heat carrier is used in the ratio of about 1 to about 15 mols preferably about 4 to about 10 mols of gas per mol of hydrocarbon reactant or in the ratio of about 1 to about 8 mols preferably about 2 to about 5 mols of hydrogen per mol of hydrocarbon reactant.

The average molecular weight of the hydrocarbon reactant is determined in the usual manner from the A. S. T. M. distillation thereof.

As stated hereinbefore, during the reaction or on-stream time the particles of catalyst become contaminated with a carbonaceous deposit generally termed coke. This deposit is removed by combustion in a gas containing free oxygen such as air. It is preferred to burn-off the deposit in a stream of combustion-supporting gas such as air in a kiln or regenerator at temperatures below that at which the catalyst is damaged. Suitable temperatures are usually of the order of about 600° to about 1400° F. preferably about 700° to about 1100° F., at pressures of about 15 to about 600 p. s. i. a. and preferably about 15 to about 35 p. s. i. a.

In accordance with the principles of the present invention, the particle form solid reforming catalyst is not saturated with carbon monoxide before contacting with the hydrocarbon reactant but is introduced into the reactor or reformer or carbon monoxide mixed with the hydrocarbon reactant or hydrocarbon reactant and gaseous heat carrier introduced into the reactor or the hydrocarbon reactant or hydrocarbon reactant and gaseous heat carrier introduced into the reactor and the carbon monoxide introduced separately into the reactor at one or more points.

While, as has been stated hereinbefore, the present invention can be used in reforming processes in which the particle form solid catalyst is substantially stationary, i. e., in situ bed or in reforming processes in which the catalyst is circulated through the reactor and a regenerator more or less continuously and while many particle form solid reforming catalysts are available to the art, the principles of the present invention will be illustrated by discussion thereof in conjunction with the circulating type of process in which the catalyst moves through the reactor as a substantially compact column of particle form catalyst. For the purpose of illustration, the catalyst discussed is a reforming catalyst comprising at least 70 mol per cent alumina and the balance, preferably about 18 to about 30 mol per cent, chromia.

It has been discovered that for improved yields that the water content of the vapor and/or gases in the reactor must be below about 0.7 mol per cent and preferably below about 0.2 mol per cent. Furthermore, the ratio of carbon monoxide to carbon dioxide in the vaporous and/or gaseous contents of the reactor as measured at the outlet thereof should be greater than the value given by the ratio $$\frac{T° F. - 700}{50}$$

and preferably greater than the value of $$\frac{T° F. - 700}{10}$$

where T° F. is the vapor temperature at the reactor outlet. Thus, when operating at various temperatures (reactor vapor outlet temperature) between 700° and 1000° F. the reactor effluent gases contain carbon monoxide, carbon dioxide and water as set forth in Table I.

*Table I*

| Reactor Effluent Gases | 800° F. Operating Temperature | |
|---|---|---|
| | Broad, Mol Per cent | Preferred, Mol Per cent |
| $CO_2$ | <1.0 | <0.5 |
| CO | 0.2–10 | 0.5–5 |
| $H_2O$ | <0.7 | <0.2 |
| $CO/CO_2$ | >2 | >10 |

*Table I.—Continued*

| Reactor Effluent Gases | 900° F. Operating Temperature | |
|---|---|---|
| | Broad, Mol Per cent | Preferred, Mol Per cent |
| $CO_2$ | <0.8 | <0.4 |
| CO | 0.4–15 | 0.7–8 |
| $H_2O$ | <0.7 | <0.2 |
| $CO/CO_2$ | >4 | >20 |

| Reactor Effluent Gases | 1,000° F. Operating Temperature | |
|---|---|---|
| | Broad, Mol Per cent | Preferred, Mol Per cent |
| $CO_2$ | <0.6 | <0.2 |
| CO | 0.5–25 | 1–10 |
| $H_2O$ | <0.7 | <0.2 |
| $CO/CO_2$ | >6 | >30 |

In general, about 0.05 to about 1.0 and usually about 0.2 to about 0.5 cubic feet of carbon monoxide will be consumed per pound of catalyst charged to the reactor. At normal catalyst-to-oil ratios of 0.1 to 0.5 in systems in which the catalyst is circulated, the loss of carbon monoxide from the system in the net gas produced is about 0.1 to about 10 cubic feet per pound of catalyst. Therefore, the total carbon monoxide feed to the system, including that which might be recovered from the product gases, will be the sum of the above two items which is about 0.2 to about 11 cubic feet per pound of catalyst.

Illustrative of the improved yields obtained with circulating catalyst, i. e., a substantially compact column of particle form solid catalyst moving through the reactor, is the following data of the reforming of a virgin Columbian naphtha having a Research Clear Octane Number of 42 and a Research (+3 cc. TEL/gal.) Octane Number of 60.

*Table II*

Charge Stock: Virgin Columbian naphtha, Boiling range—200° to 400° F., Clear O. N.—42+3 cc. TEL/gal.—60.
Catalyst: Chromia-alumina particle form solid catalyst.
Concurrent flow of vapors and catalyst.

| | I No CO | II CO Added to Reactants |
|---|---|---|
| Pressure, p. s. i. a | 190 | 190 |
| Recycle gas, mols gas/mols naphtha | 6 | 6 |
| Catalyst Inlet Temp., ° F | 800 | 800 |
| Vapor Inlet Temp., ° F | 1,040 | 1,040 |
| Vapor Outlet Temp., ° F | 960 | 956 |
| Average Temp., ° F | 980 | 978 |
| Catalyst Rate, lb./lb. naphtha | 0.2 | 0.2 |
| Space Velocity, V./Hv/V | 1.0 | 1.0 |
| Carbon Monoxide: | | |
|   Cubic foot per lb. of catalyst | 0 | 0.60 |
|   Cubic feet per bbl. of naphtha | 0 | 30.5 |
| Carbon Monoxide consumed: | | |
|   Cubic foot per lb. of catalyst | 0 | 0.13 |
|   Cubic feet per bbl. of naphtha | 0 | 6.5 |
| $CO/CO_2$ in reactor effluent gases | | 44 |
| O. N. of 10 R. V. P. gasoline (Research): | | |
|   Clear | 93 | 93 |
|   +3 cc. TEL/gal | 98 | 98 |
| Yield 10 R. V. P. gasoline, percent charge | 81 | 85 |
| Yield Improvement | | 4 |

The increased yield represents an increase of about 120,000 barrels of gasoline per year for a reforming operation treating 10,000 barrels of naphtha per stream day.

Figure 2:
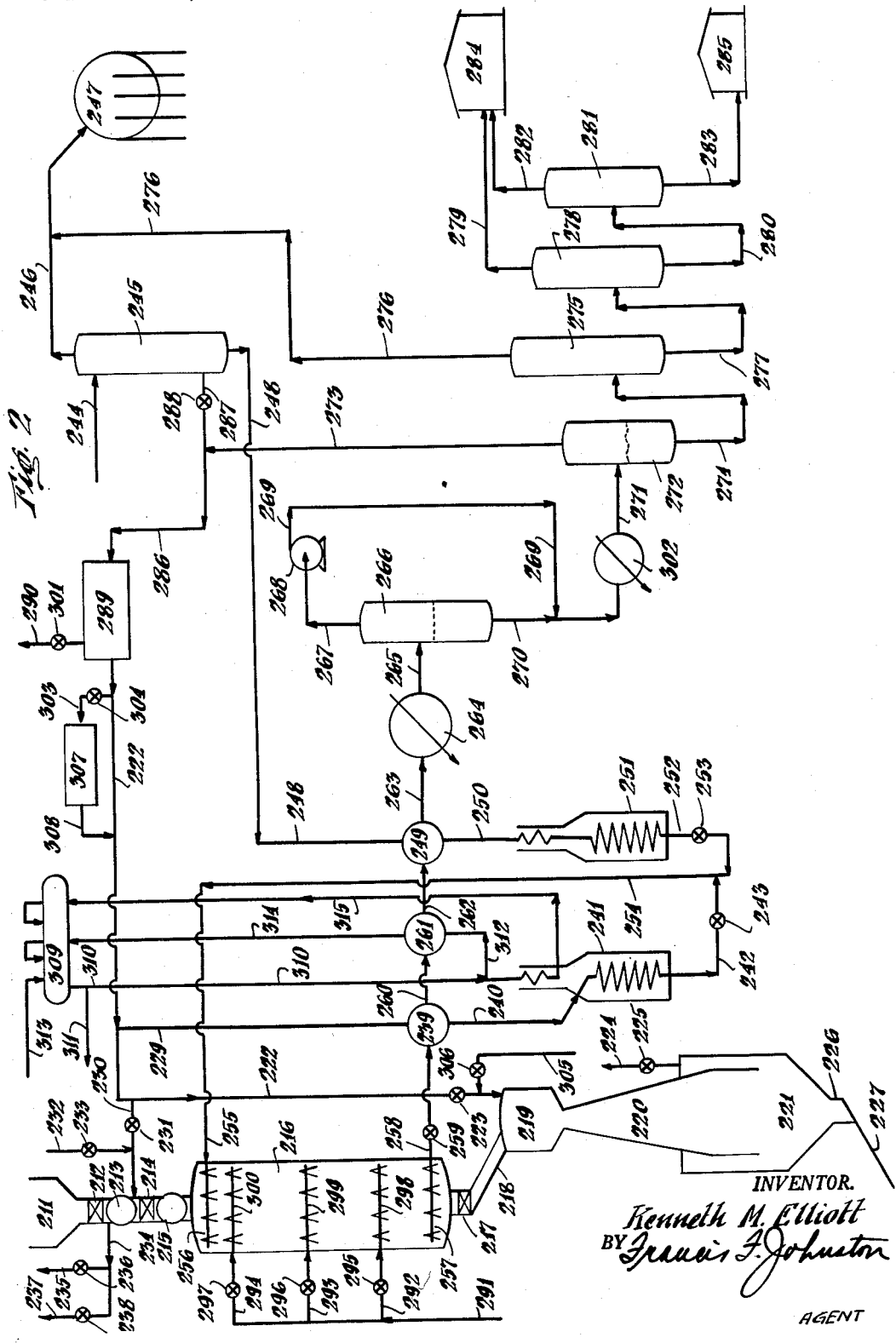

Accordingly, it is an object of the present invention to provide an improved method of reforming hydrocarbons in which a hydrocarbon reactant is reformed in the presence of particle form solid reforming catalyst and carbon monoxide is introduced into the reactor while introducing said hydrocarbon reactant into said reactor. It is another object of the present invention to provide an improved method of reforming hydrocarbons in the presence of hydrogen at a hydrogen partial pressure greater than 1 atmosphere in the presence of particle form solid reforming catalyst wherein carbon monoxide is introduced into the reactor. It is a further object of the present invention to provide an improved method of reforming hydrocarbons in which carbon monoxide is introduced into the reactor with the hydrocarbon reactant and the $CO/CO_2$ ratio in the effluent gases from the reactor is greater than $$\frac{T°F.-700}{50}$$

where T° F. is the vapor temperature at the reactor outlet. Other objects and advantages of the present invention will become apparent to those skilled in the art from the following description thereof taken in conjunction with the drawings, in which Figure 1 is a schematic flow sheet illustrating the reforming of a hydrocarbon reactant in the presence of a particle form solid reforming catalyst and carbon monoxide wherein the particle form solid reforming catalyst flows downwardly through the reactor as a substantially compact column, and a mixture of hydrocarbon reactant, gaseous heat carrier and carbon monoxide flows upwardly countercurrent to the downwardly flowing substantially compact column of solid reforming catalyst;

Figure 2 is a schematic flow sheet illustrating the reforming of a hydrocarbon reactant in the presence of particle form solid reforming catalyst and carbon monoxide wherein the particle form solid reforming catalyst flows downwardly through the reactor as a substantially compact column, a mixture of hydrocarbon reactant and gaseous heat carrier flows downwardly concurrent with said moving substantially compact column of particle form solid reforming catalyst and carbon monoxide is introduced into the reactor at one or a plurality of points on the vertical axis of the aforesaid column of catalyst; and Figure 3 is a schematic flow sheet illustrating the reforming of a hydrocarbon in the presence of particle form solid reforming catalyst and carbon monoxide wherein the particle form solid reforming catalyst flows downwardly through the reactor as a substantially compact column and a first charge mixture comprising a mixture of hydrocarbon reactant, gaseous heat carrier and carbon monoxide is introduced into the reactor at a point intermediate the upper and lower ends of the reactor and flows upwardly counter-current to said downwardly flowing column of catalyst and a second charge mixture comprising a mixture of the same or different hydrocarbon reactant, gaseous heat carrier and carbon monoxide is introduced into the reactor at a point intermediate the point of introduction of the aforesaid first charge mixture and the lower end of said reactor.

Referring now to Figure 1. Active catalyst in reactor feed bin 11 is transferred to reactor 16 when the latter is operating at pressures of the order of 100 to 600 p. s. i. a. through a reactor-sealing and particle transfer means of any suitable type whereby solid particles can be transferred from a zone of given pressure to a zone of substantially higher pressure. Such a reactor-sealing and particle transfer means, as illustrated, comprises gas-tight valves 12 and 14 and intermediate pressuring chamber or vessel 13. The reactor-sealing and catalyst transfer means illustrated operate cyclically as follows: With gas-tight valve 14 closed and gas-tight valve 12 open, active catalyst flows from bin 11 into chamber 13 until chamber 13 is filled with catalyst to a predetermined level. Gas-tight valve 12 closes and with valves 54 and 61 closed chamber 13 and the contents thereof are purged with an inert and/or non-flammable gas such as flue gas drawn from a source not shown and passed through pipes 55 and 53 under control of valve 56 into chamber 13. The purge is vented through pipes 57 and 58 with valve 59 open. After purging, valve 59 is closed and the pressure in chamber 13 is raised to at least that of reactor 16 and preferably to a pressure of about 5 to 10 p. s. i. greater by introducing gas, such as the gaseous heat carrier, or recycle gas into chamber 13. For example, recycle gas under the pressure produced by compressor 94 flows from pipe 51 through pipes 52, 62 and 53 under control of valve 54 into chamber 13 until the pressure therein is at least equal to that in the reactor. Valve 54 closes and gas-tight valve 14 opens. Catalyst then flows from chamber 13 into surge chamber 15. When chamber 13 is empty of catalyst, gas-tight valve 14 closes, valve 61 opens and the gaseous contents of chamber 13 are vented through pipes 57 and 60 until the pressure in chamber 13 is substantially atmospheric. Valve 61 closes, valves 56 and 59 open and chamber 13 is purged with an inert and/or non-flammable gas such as flue gas. This completes a cycle.

The particle form solid reforming catalyst, for example a reforming catalyst, comprising at least 70 mol per cent alumina and the balance chromia, flows from surge chamber 15 into reactor 16 and downwardly through reactor 16 as a substantially compact column of particle form solid reforming catalyst. During passage through the reaction zone a carbonaceous deposit, termed coke, is laid down on the catalyst particles. For reasons of economy the coke which at least partially deactivates the catalyst must be burned off. The partially deactivated catalyst flows from reactor 16 through catalyst flow control means 17 which can be of any suitable type such as a throttle valve into surge chamber 18. The catalyst is removed from the reactor when it is to be regenerated at a pressure below reactor pressure, by a reactor-sealing and solid particle transfer means of any suitable type whereby solid particles can be transferred from a zone of given pressure to a zone of lower pressure. The reactor-sealing and solid particle transfer means illustrated is similar to that described hereinbefore and comprises gas-tight valves 19 and 21 and intermediate depressuring chamber or vessel 20 which operates cyclically. The cycle is as follows: With gas-tight valves 19 and 21 closed, depressuring chamber 20 is purged with an inert and/or non-flammable gas such as flue gas flowing from a source not shown through pipes 65 and 64 under control of valve 66 with valve 63 closed. The purge is vented through pipes 67 and 68 under control of valve 69 with valve 71 closed. After purging valves 69 and 66 close and valve 63 opens whereby pressuring gas such as recycle gas under pressure of compressor 94 flows from pipe 51 through pipes 52, 62 and 64 under control of valve 63 until the pressure in chamber 20 is substantially that of reactor 16. Valve 63 closes, gas-tight valve 19 opens and catalyst flows into chamber 20 until the catalyst reaches a predetermined level. Gas-tight valve 19 closes, valve 71 opens and the pressure in chamber 20 is reduced to that of kiln or regenerator 29 by venting to the atmosphere through pipes 67 and 70 under control of valve 71. When the pressure in chamber 20 has been reduced to that of kiln 29, valve 71 closes and chamber 20 is purged with an inert and/or non-flammable gas as described hereinbefore. After purging, gas-tight valve 21 opens and catalyst flows into surge chamber 22 until depressuring chamber 20 is empty of catalyst. This completes the cycle.

The partially deactivated catalyst flows from surge chamber 22 through conduit 23 to chute 24 and thence to a catalyst transfer means of suitable type such as an elevator, gas-lift and the like 25 by means of which the catalyst is transferred to kiln or regenerator 29. As illustrated, the catalyst transfer means is an elevator delivering deactivated catalyst to chute 26 along which it flows to kiln feed bin 27.

From feed bin 27 the catalyst flows through conduit 28 to kiln or regenerator 29 of any suitable type in which the carbonaceous deposit can be burned off in a stream of combustion-supporting gas such as air. The flue gas so produced which can be used to purge pressuring chamber 13 and depressuring chamber 20 usually contains about 13 to about 20 per cent carbon dioxide, about 10 to about 5 per cent carbon monoxide, about 0 to about 1 per cent oxygen and the balance nitrogen.

The at least partially deactivated catalyst flows downwardly through kiln 29 to the outlet thereof and thence through conduit 30 and chute 31 to a catalyst transfer means of any suitable type such as a gas-lift and the like, elevator, etc., 32. As illustrated, catalyst transfer means 32 is an elevator discharging into chute 33 along which reactivated catalyst flows to reactor feed bin 11 completing the cycle.

The flow of reactant and reactor effluent now will be traced. A hydrocarbon reactant at least a portion of which is capable of undergoing molecular changes such as isomerization, hydrogenation, dehydrogenation and dehydrocyclization such as a petroleum naphtha is drawn from a source not shown through line 46. The hydrocarbon reactant flows downwardly through absorber 45 in contact with net make gas flowing upwardly therethrough from pipe 43 under control of valve 44. The hydrocarbon reactant strips the net make gas of light hydrocarbons and leaves absorber 45 through line 72. The stripped net make gas leaves absorber 45 by pipe 47 and flows to refinery gaseous fuel reservoir 48.

The hydrocarbon reactant flows along line 72 to heat exchanger 73 and thence to heater or furnace 74. In heater 74 the hydrocarbon reactant is heated to a temperature such that when mixed with heated gaseous heat carrier to form a charge mixture the temperature of the charge mixture will be about 850° to about 1080° F. and preferably about 960° to about 1060° F. The heated hydrocarbon reactant leaves furnace 74 through line 75 and flows to line 77 under control of valve 76.

Gaseous heat carrier, as illustrated recycle gas, flows under pressure produced by compressor 94 from liquid gas separator 40 through pipe 41 to pipe 42. By regulation of valve 44 an amount of gas substantially equivalent to the net gas make is bled off through line 43 to absorber 44. The balance flows along pipe 42 to carbon dioxide absorber 49 of any suitable type such as a triethanol amine absorber from which carbon dioxide is removed by pipe 50. The recycle gas substantially devoid of carbon monoxide or at least containing not more than about 0.5 to 1.0 mol per cent maximum carbon dioxide flows from absorber 49 through pipe 51, and thence through heat exchanger 85 to heater or furnace 37. At some point on pipe 51 carbon monoxide is added from a source not shown through pipe 111 under control of valve 112. The recycle gas containing about 0.2 to about 25 mol per cent and preferably about 0.5 to about 10 mol per cent carbon monoxide and having a $CO/CO_2$ ratio of about 2 to 300, preferably about 10 to about 150, is heated in furnace 37 to a temperature such that when mixed with the heated hydrocarbon reactant in the ratio of about 1 to about 15 mols, preferably about 4 to about 10 mols, of recycle gas or about 1 to about 8 mols, preferably about 2 to about 5 mols, of hydrogen per mol of hydrocarbon reactant to form a charge mixture, the charge mixture has a temperature of about 850° to about 1080° F. preferably about 960° to about 1060° F.

The heated recycle gas containing carbon monoxide flows from furnace 37 through pipe 78 to line 77 under control of valve 79. In line 77 the heated hydrocarbon reactant and the heated recycle gas containing carbon monoxide are mixed in the ratio set forth hereinbefore to form a charge mixture having a temperature of about 850° to about 1080° F., preferably about 960° to about 1060° F. The heated charge mixture flows from line 77 to distributor 80 under a pressure of 15 to about 600 p. s. i. a. and preferably about 100 to about 300 p. s. i. a.

Distributor 80 is of any suitable type whereby the charge mixture can be distributed over the cross section of reactor 16.

The vapors of hydrocarbon reactant and the recycle gas containing carbon monoxide flow upwardly from distributor 80 counter-current to the downwardly flowing substantially compact column of particle form solid reforming catalyst. During passage upwardly through reactor and through contact with the catalyst at least a portion of the hydrocarbon reactant is reformed. The vaporous and gaseous contents of the reactor flow therefrom through line 82 under control of valve 83 to heat exchanger 85 thence through line 86 to heat exchanger 87, through line 88 to heat exchanger 73 and thence through line 89 to condenser 90 wherein the constitutents of the effluent boiling in the gasoline range condenses. The condensed and uncondensed effluent flow along line 91 to separator 92 from which the uncondensed effluent is drawn by compressor 94 through pipe 93 compressed to at least a reaction pressure and discharged into pipe 95. The condensed portion of the effluent flows from separator 92 through line 96. The compressed uncondensed portion of the effluent flows from pipe 95 into line 96 and mixes with the condensed effluent. The mixture of condensed and uncondensed effluent in line 96 flows through condenser 97 and line 98 to gas-liquid separator 40.

In separator 40 the uncondensed effluent or recycle gas flows through pipe 41 to pipe 42 where a portion is bled off through pipe 43 under control of valve 44 as described hereinbefore. The condensed effluent leaves separator 40 through line 99 and flows to the depropanizer 100 where a propane cut is taken overhead through pipe 101 to pipe 47 and thence to refinery fuel gas reservoir 48.

The bottoms of depropanizer 100 flows along line 102 to primary rerun tower 103. An overhead cut of improved octane rating is taken through line 104 to reservoir 105 for storage and/or distribution and/or after treatment. The bottoms from primary rerun tower 103 flows through line 106 to secondary rerun tower 107.

An overhead cut of improved octane number is taken from rerun tower 107 through line 108 to storage and/or distributor reservoir 105. The bottoms from secondary rerun tower 107 flows through line 109 to storage 110.

It is to be noted that waste heat is used to produce steam by passing water from steam drum 34 through pipes 35 and 36, coil 37 of kiln or regenerator 29, and passing the steam so produced back to drum 34 through pipe 38. Water also flows from drum 34 through pipe 35 to furnace 111 and thence through pipe 112 to drum 34. A portion of the water in pipe 35 flows through pipe 39 to heat exchanger 87 and back to drum 34.

Referring to Figure 2. Active catalyst in reactor feed bin 211 is transferred to reactor 216 when the latter is being operated at super-atmospheric pressures in excess of 40 p. s. i. a. by means of a reactor-sealing and solid particle transfer means of any suitable type. As illustrated, the reactor-sealing and solid particle transfer means comprises gas-tight valves 212 and 214 and intermediate pressuring chamber or vessel 213 which operates in a cyclic manner as follows: With gas-tight valve 214 closed and gas-tight valve 212 open, catalyst flows from feed bin 211 into chamber 213 to a predetermined level. Valve 212 closes and with valves 231 and 236 closed, chamber 213 and its contents are purged with an inert and/or non-flammable gas drawn from a source not shown and flowing through pipes 232 and 230 under control of valve 233 into chamber 213. The purge is vented through pipes 234 and 237 under control of valve 238. After purging, valves 238 and 233 close and valve 231 opens and chamber 213 is pressured as described hereinbefore with recycle gas flowing under pressure from pipe 222 through pipe 230. When the pressure in chamber 213 is at least equal to the reactor pressure valve 231 closes and valve 214 opens permitting catalyst in chamber 213 to flow into surge chamber 215. When chamber 213 is empty of catalyst, valve 214 closes and valve 236 opens whereby the pressure in chamber 213 is reduced to atmospheric by venting the gaseous contents thereof through pipes 234 and 235 under control of valve 236. Chamber 213 is then purged as described hereinbefore completing the cycle.

Catalyst flows from surge chamber 215 into reactor 216 and flows downwardly through reactor 126 as a substantially compact column of particle form solid reforming catalyst. Catalyst flows from reactor 216 through catalyst flow control means 217 which can be of any suitable type such as throttle valve and conduit 218 to a reactor-sealing and solid particle transfer means of any suitable type when the catalyst is to be regenerated at pressures substantially less than reactor pressure.

The reactor-sealing and solid particle transfer means illustrated is a reactor-sealing and depressuring leg comprising seal chamber 219, depressuring leg 220 and disengaging chamber 221. Sealing gas, such as steam or flue gas, flows from a source not shown into chamber 219 through pipe 305 under control of valve 306. Preferably the sealing gas is hydrocarbon recycle gas flowing from pipe 222 under control of valve 223. The sealing gas is under a pressure of at least 0.5 pound per square inch greater than the pressure in reactor 216. The catalyst flows from seal chamber 219 through the depressuring leg 220 in which the diameter or cross-sectional area of the column of particle form solid reforming catalyst varies in accordance with the equation $$\frac{A_2}{A_1} = \left(\frac{P_1}{P_2}\right)^{\frac{1}{n+2}}$$

wherein $A_1$ and $A_2$ are the cross-sectional areas of the depressuring leg and catalyst column at selected levels 1 and 2, respectively, and $P_1$ and $P_2$ are the absolute pressures existing at levels 1 and 2, respectively, and $n$ is a constant depending upon flow conditions from minus 1 for viscous flow to minus 0.15 for turbulent flow with values intermediate the foregoing for the mixed flow regions. A more detailed discussion of the depressuring leg is given in co-pending application Serial No. 329,882 filed in the names of Robert D. Drew and Russell Lee on January 6, 1953.

The catalyst flows from the depressuring leg into the disengagor 221 where the seal gas is vented through pipe 224 under control of valve 225 and thence through conduit 226 and chute 227 to any suitable catalyst transfer means such as a gas lift and the like, elevator, etc., (not shown) whereby the catalyst is transferred to a kiln or regenerator (not shown) and then after reactivation, returned to feed bin 211 completing the cycle.

A hydrocarbon reactant such as a naphtha, for example the Columbian naphtha, for which data are given in Table II herein, kows from a source not shown through line 244 to absorbed 245 and flows downwardly therein countercurrent to rising gas introduced into the absorber 245 from pipe 287. The gas passing through the absorber is substantially equivalent in amount to the net gas make of the reactor and is separated from the condensed effluent in liquid-gas separator 272 under the pressure produced by compressor 268. The gas flows under pressure from separator 272 through pipe 273 to pipe 286 where a portion usually substantially equivalent to the net gas make of the reformer 216 is bled off through pipe 287 under control of valve 288. In passage through the absorber 245, the gas is stripped of light hydrocarbons and flows to the refinery gas fuel reservoir 247 through pipe 246.

The hydrocarbon reactant leaves absorber 245 through line 248 and passes through heat exchanger 249 and line 250 to heater 251. In heater 251, the hydrocarbon reactant is heated to a temperature such that when mixed with heated gaseous heat carrier as described hereinafter to form a charge mixture, the charge mixture will have a temperature of about 850° to about 1080° F., preferably about 960° to about 1060° F. The heated hydrocarbon reactant flows from heater 251 through line 252 under control of valve 253 to line 254.

A gaseous heat carrier such as recycle gas separated from the condensed portion of the reactor effluent in liquid-gas separator 272 flows under the pressure produced by compressor 268 from separator 272 through pipe 273 to pipe 286. The portion thereof which is not bled off through pipe 287 flows through the carbon dioxide removal unit 289 which can be of any suitable type such as a caustic scrubber. Carbon dioxide is removed from the unit through pipe 290 under control of valve 301.

From carbon dioxide removal unit the recycle gas containing not more than about 0.5 to 1.0 mol per cent maximum flows along pipe 222 to pipe 229, through heat exchanger 239 and pipe 240 to heater 241. In heater 241 the gaseous heat carrier, for example recycle gas, is heated to a temperature such that when mixed with heated hydrocarbon reactant in line 254 in the ratio of about 1 to about 15 mols, preferably about 4 to about 10 mols, of recycle gas or about 1 to about 8 mols, preferably about 2 to about 5 mols, of hydrogen per mol of hydrocarbon reactant, the average molecular weight of which is determined in the usual manner from A. S. T. M. distillation curve, to form a charge mixture, the charge mixture will have a temperature of about 850° to about 1080° F. and preferably about 960° to about 1060° F.

The heated gaseous heat carrier, for example recycle gas, flows from heater 241 through pipe 242 under control of valve 243 to line 254 wherein it is mixed with heated hydrocarbon reactant in the proportions set forth hereinbefore to form a charge mixture. The charge mixture flows along line 254 at a pressure at least that of the reactor and preferably about 0.5 p. s. i. greater to line 255 and distributor 256 of any type suitable to distribute the charge mixture over the cross-section of reactor or reformer 216.

Carbon monoxide, flowing from a source not shown through manifold 291 which is provided with a plurality of branches indicated by branches 292, 293 and 294, is introduced into the reactor 216 at one or more points along the vertical axis of the reactor through distributors 298, 299 and 300 under control of valves 295, 296 and 297 to provide a gaseous and/or vaporous reaction mixture containing about 0.2 to about 25 mol per cent and preferably about 0.5 to about 10 mol per cent carbon monoxide and having a $CO/CO_2$ ratio of about 2 to 300, preferably about 10 to about 150.

The hydrocarbon reactant recycle gas and carbon monoxide flows downwardly through reactor 216 concurrent with the downwardly flowing substantially compact column of particle form reforming catalyst. The reformate leaves reactor 216 through collector 257 and line 258 under control of valve 259 and flows through heat exchanger 239, line 260, heat exchanger 261, line 262, heat exchanger 249, line 263, condenser 264 and line 265 to liquid-gas separator 266. In liquid-gas separator 266, the condensed effluent separates from the uncondensed effluent and leaves separator 266 through line 270. The uncondensed effluent leaves separator 266 by pipe 267, is compressed to at least reactor pressure by compressor 268, is discharged therefrom into pipe 269 and flows therethrough to line 270 where it mixes with the condensed effluent.

The mixture of condensed and uncondensed effluent in line 270 flows through line 270 to condenser 302 and thence via line 271 to liquid-gas separator 272 in which the uncondensed effluent is separated from the condensed effluent. The uncondensed effluent, i. e., recycle gas, make gas and light hydrocarbons, leaves separator 272 through pipe 273 and flows in part through line 287 to the absorber 245 and in part through line 286 for use in the reactor and pressuring chamber and as sealing gas. When the recycle gas contains in excess of 0.7 per cent moisture when leaving carbon dioxide absorber 289, a portion or the whole thereof is diverted through pipe 303 under control of valve 304 to dehydrator 307, which can be of any suitable type, for example, a bed of granular solid dessicant. From dehydrator 307, the dehydrated recycle gas flows through pipe 308 to pipe 222.

The recycle gas in pipe 222 contains less than about 1 to about 0.6 and preferably less than about 0.5 to about 0.2 mol per cent carbon dioxide, about 2 to about 25, preferably about 0.5 to about 10, mol per cent carbon monoxide, less than about 0.7, preferably less than about 0.2, mol per cent water and has a carbon monoxide to carbon dioxide ($CO/CO_2$) ratio of about 2 to about 300 and preferably about 10 to about 150 the minimum value being greater than the value of R in the equations:

$$R = \frac{T°F. - 700}{50} \text{ and } R = \frac{T°F. - 700}{10}$$

where T° F. is the vapor temperature at the reactor outlet.

The condensed effluent flows from liquid-gas separator 272 through line 274 to depropanizer 275 where a $C_3$ cut is taken overhead through pipe 276 to pipe 246 and refinery fuel storage sphere 247. The bottoms of depropanizer 275 flows through line 277 to primary re-run tower 278 where a gasoline cut of improved octane rating is taken overhead through line 279 to storage, distribution, after-treatment and the like 284. The bottoms of primary re-run tower 278 flows through line 280 to secondary re-run tower 281 where a gasoline cut of improved octane rating is taken overhead through line 282 to storage 284. The bottoms from secondary re-run tower 281 flows through line 283 to storage 285.

In order to maintain an efficient heat balance in the system, water in steam drum flows through pipe 310 and thence in part through pipe 311 to the coil of the regenerator not shown and in part to heater 241 and in part through pipe 312 to heat exchanger 261. The steam thus produced flows from the kiln back to drum 309 through pipe 313, that produced in heat exchanger 261 flows to drum 309 through pipe 314 and that produced in heater 241 flows to drum 309 through pipe 315.

In Figure 3 is shown schematically a method of operating a reformer with a split feed in which carbon monoxide is present in the gaseous reactants of only one of the two reaction zones. For clarity of description, the course of the catalyst through the two reaction zones of the reformer will be followed and then the paths of the reactants through the two reaction zones will be traced.

Active catalyst in reactor feed bin 411 is transferred to reactor 416 when the latter is operated at pressures greater than about 40 p. s. i. a. through a reactor-sealing and solid particle transfer means of any suitable type. Thus, for example, the reactor-sealing and solid particle transfer means can comprise gas-tight valves 412 and 414 and intermediate pressuring chamber 413. The reactor-sealing and solid particle transfer means illustrated operates in a cyclic manner as follows: With gas-tight valve 414 closed and gas-tight valve 412 open, particle form solid reforming catalyst flows from hopper 411 into chamber 413 until the chamber is filled to a predetermined level. Valve 412 closes and valves 426 in pipe 425 and 432 in pipe 431 open. With valves 429 and 434 closed, chamber 413 is purged with an inert and/or non-flammable gas such as flue gas usually containing about 13 to about 20 per cent carbon dioxide and about 0 to about 5 per cent carbon monoxide, flowing from a source not shown through pipes 425 and 427. The purge is vented through pipes 430 and 431. Valves 426 and 432 close and valve 429 opens. Recycle gas flows from pipe 494 under pressure somewhat greater than reactor pressure, say 0.5 p. s. i., through pipes 428 and 427 under control of valve 429 into pressuring chamber 413 until the pressure in chamber 413 is at least equal to and preferably somewhat higher than the pressure in reactor 416. Valve 429 closes and valve 414 opens permitting the catalyst to flow into surge chamber 415. When chamber 413 is empty of catalyst valve 414 closes and valve 434 opens permitting the pressure in chamber 413 to fall to that of the atmosphere. Then valve 434 closes and chamber 413 is purged with an inert and/or non-flammable gas such as flue gas flowing from a source not shown through pipes 425 and 427 under control of valve 426. The purge is vented through pipes 430 and 433 under control of valve 434 completing the cycle.

The particle form solid reforming catalyst flows from surge chamber 415 and through reactor 416 as a substantially compact column of particle form solid reforming catalyst. During passage therethrough and as a result of contact with the hydrocarbon reactants, the catalyst is partially deactivated by a carbonaceous deposit or coke. The partially deactivated catalyst flows from the reactor 416 through catalyst flow control means 417 of any suitable type such as a throttle valve to surge chamber 418.

When the catalyst is regenerated at a pressure less than that of the reactor, the catalyst is removed from the reactor by means of any suitable reactor sealing and solid particle transfer means. As illustrated the reactor sealing and catalyst transfer means comprises gas-tight valves 419 and 421 and intermediate depressuring chamber 420. The reactor sealing and catalyst transfer means operates in a cyclic manner as follows: With gas-tight valves 419 and 421 closed, depressuring chamber 420 is purged with an inert and/or non-flammable gas such as flue gas flowing from a source not shown through pipes 435 and 437 under control of valve 436 with valve 439 closed. The purge is vented through pipes 440 and 441 with valves 442 open and valve 444 closed. After purging, valves 436 and 442 close and valve 439 opens permitting pressuring gas such as recycle gas to flow from pipe 445 into chamber 420 until the pressure therein is equal to about that in reactor 416. When the pressure in chamber 429 is about equal to that in reactor 416, valve 439 closes and valve 419 opens permitting catalyst to flow into chamber 420 from surge chamber 418 until chamber 420 is filled with catalyst to a predetermined level. Valve 419 closes and valve 444 opens permitting the gaseous contents of chamber 420 to escape through pipes 440 and 443 under control of valve 444, until the pressure in chamber 420 is substantially that in the kiln or regenerator, for example atmospheric. Valve 444 closes and chamber 420 is purged with an inert and/or non-flammable gas flowing from a source not shown through pipes 435 and 437 under control of valve 436 and vented through pipes 440 and 441 under control of valve 442. After purging, valve 421 opens and the catalyst flows into surge chamber 422 completing the cycle and thence through conduits 423 and 424 to a catalyst transfer means whereby the partially deactivated catalyst is transferred to a regenerator or kiln not shown. Suitable catalyst transfer means are a gas-lift and the like, elevator, etc. The partially deactivated catalyst is regenerated by burning the coke off in a stream of combustion supporting gas such as air. The reactivated catalyst flows from the kiln to a catalyst transfer means such as a gas-lift or the like, an elevator, etc., by means of which the reactivated catalyst is returned to reactor feed bin 411 completing the cycle.

While the present description will be of the treatment of a single hydrocarbon reactant in two reforming zones, it will be manifest to those skilled in the art that by the addition of an additional heater or furnace to that shown in Figure 3 in which a second hydrocarbon reactant can be heated, the flow sheet of Figure 3 illustrates a system in which two hydrocarbon reactants can be reformed.

Hydrocarbon reactant flows from a source not shown through line 446 to absorber 447 and downwardly therethrough to outlet line 448. Uncondensed effluent from one or both reforming zones in an amount substantially equal to the net gas make of the reactor flows from pipe 449 under control of valve 450 and/or from pipe 451 under control of valve 452 to absorber 447. The uncondensed effluent, i. e., recycle gas flows upwardly in absorber 447 counter-current to the downwardly flowing hydrocarbon reactant. Thereby the gas is stripped of light gasoline and leaves absorber 447 through pipe 453 to fuel sphere 454.

The hydrocarbon reactant leaves absorber 447 via line 448 to heat exchanger 455, line 456, heat exchanger 457 and line 458 to heater or furnace 459. In furnace 459, the hydrocarbon reactant is heated to a temperature such that, when mixed with heated gaseous heat carrier or heated recycle gas in the proportions set forth hereinafter in lines 462 and 463 to form a charge mixture, the resultant charge mixtures have a temperature of about 850° to about 1080° F. and preferably about 960° to about 1060° F. The heated hydrocarbon reactant leaves furnace 459 via line 460 and flows partly into line 463 and partly into line 462 under control of valve 461.

In order to obtain the maximum yield at a required octane rating in a split feed reactor the depth of bed in both reforming zones and/or the space velocity in each zone are regulated to produce the maximum yield of reformate of required octane rating in each zone. (For a fuller discussion of split feed operation, see co-pending application Serial No. 285,484, filed in the name of Kenneth M. Elliott, May 1, 1952.) Accordingly, the reactor is provided with a plurality of pairs of charge mixture inlets 464 and 470, 466 and 472, 468 and 474 and the like whereby the reactor is divided into two reforming zones of complementary depth. Thus, the reforming zone formed between the distributor 476 and collector 482 has a depth which is 20% of the total depth of the reactor while the reforming zone formed between distributor 477 and collector 483 has a depth which is 80% of the total depth of the reactor. Similarly, distributors 478 and 479 divide reactor 416 into two reforming zones of equal volume while the reforming zone formed between distributor 480 and collector 482 has a depth which is 80 per cent of the total depth of the reactor and the reforming zone formed between distributor 481 and collector 483 has a depth which is 20 per cent of the total depth of the reactor. Of course, the total volume of the reactor can be divided into zones of different depth than those illustrated by proper positioning of the pairs of distributors. For simplicity, it will be assumed that the hydrocarbon reactant can be reformed to a required octane number in maximum yield by splitting the hydrocarbon reactant in equal portions to two reforming zones, the upper one being between distributor 476 and collector 482 and the lower reforming zone being between distributor 477 and collector 483.

The effluent from the upper zone "U" leaves the reactor through line 549 under control of throttling means 550 such as a throttling valve and flows through heat exchanger 551, line 552, heat exchanger 553, line 554, heat exchanger 455, line 555, condenser 483 and line 484 to liquid gas separator 485. In liquid gas separator 485 the uncondensed effluent from zone "U" flows through pipe 486 to compressor 487 and thence through pipe 488 at a pressure higher than reactor pressure to line 489 where the compressed uncondensed effluent from zone "U" is mixed with condensed effluent from zone "U" which flows from separator 485 through line 489. The condensed and uncondensed effluent flows through line 489 to cooler 490 and thence to liquid gas separator 491.

In liquid gas separator 491 the uncondensed effluent, i. e., recycle gas flows out through pipe 451. A portion, usually equivalent to the net gas make in zone "U" is bled off to absorber 447 and the balance flows through pipe 492 to carbon dioxide absorber 493 of any suitable type such as a caustic scrubber. The recycle gas leaving carbon dioxide absorber 493 contains not more than about 0.5 to about 1.0 mol per cent carbon dioxide and flows through pipe 494 to heat exchanger 551. At some point on pipe 494 the carbon monoxide content of the recycle gas is adjusted so that the recycle gas contains about 0.2 to about 25, preferably about 0.5 to about 10 mol per cent carbon monoxide and has a $CO/CO_2$ ratio of about 2 to 300 preferably about 10 to 150. When the carbon monoxide content of the recycle gas is less than that set forth hereinbefore, carbon monoxide in amounts sufficient to provide the concentration given hereinbefore is admitted to pipe 494 from a source not shown through pipe 495 under control of valve 496.

The recycle gas flows from heat exchanger 551 through pipe 497 to heater or furnace 498 and thence through pipe 499 under control of valve 500 to line 462 where the heated recycle gas is mixed with heated hydrocarbon reactant in the ratio of about 1 to about 15 mols preferably 4 to 10 mols recycled gas or 1 to 8 mols preferably 2 to 5 mols hydrogen per mol of hydrocarbon reactant to form charge mixture A.

The recycle gas is heated in furnace 498 to a temperature such that when mixed with heated hydrocarbon reactant in line 462 in the ratio given hereinbefore the resultant charge mixture has a temperature of about 850° to about 1080° F. preferably about 960° to about 1060° F.

The heated charge mixture "A" containing carbon monoxide as aforestated flows through line 462 under control of valve 469 to branch 468 and thence to distributor 476.

The effluent from lower zone "L" leaves reactor 416 through collector 483 and line 501 under control of throttling means 502 which can be of any suitable type such as a throttle valve. The effluent flows along line 503, through heat exchanger 504, line 505, heat exchanger 506, line 507, heat exchanger 457, line 508, condenser 509 and line 510 to liquid gas separator 511.

In separator 511 the uncondensed effluent separates from the condensed effluent and flows from separator 511 through pipe 512 to compressor 513. Compressor 513 compresses the uncondensed effluent to a pressure greater than the pressure in reforming zone "L" and discharges the compressed uncondensed effluent into pipe 514.

The condensed effluent flows from separator 511 through line 515. The compressed uncondensed effluent flows through pipe 514 to line 515 and is mixed therein with the condensed effluent. The mixed condensed and uncondensed effluent flows through line 515 to cooler 516 and thence through line 517 to gas liquid separator 518.

In separator 518 the uncondensed effluent separates and flows through pipe 519 to pipe 445 where a portion usually equal to the net gas make is bled off under control of valve 450 to absorber 447. The balance containing little or no carbon monoxide or carbon dioxide is the recycle gas for use in zone "L."

The recycle gas flows along pipe 445 to pipe 520 through heat exchanger 504 and line 521 to heater or furnace 522. The heated recycle gas leaves furnace 522 by pipe 523 under control of valve 524, and flows to line 463 where it mixes with heated hydrocarbon reactant in the ratio of about 1 to about 15, preferably about 4 to about 10 mols recycle gas per mol of hydrocarbon reactant or about 1 to about 8 mols, preferably about 2 to about 5 mols of hydrogen per mol of hydrocarbon reactant to form charge mixture "B."

The recycle gas is heated in furnace 522 to a temperature such that when mixed in the ratio aforestated with heated hydrocarbon reactant to form charge mixture "B," charge mixture "B" has a temperature of about 850° to about 1080° F. and preferably about 960° to about 1060° F., charge mixture "B" flows through line 463 to branch 474 and distributor 477 under control of valve 475.

Charge mixture "A" flows upwardly from distributor 476 countercurrent to the downwardly flowing substantially compact column of particle form solid reforming catalyst to collector 482. Charge mixture "B" flows downwardly from distributor 477 concurrent with the downwardly flowing substantially compact column of particle form solid reforming catalyst to collector 483.

Having described the origin and course of the recycle gas used in each of the reforming zones, description of the method will be resumed at separators 491 and 518.

In separator 491 the uncondensed effluent which is the recycle gas for zone "U" flows therefrom through pipe 451 and thence to heater 498. The condensed effluent flows from separator 491 through line 525 to line 526.

In separator 518 the uncondensed effluent which is the recycle gas for zone "L" flows therefrom through pipe 519 and thence to heater 522. The condensed effluent flows from separator 518 through line 527 to line 526.

The condensed effluents from both zones in line 526 flow to depropanizer 528 from which a C₃ cut is taken overhead through pipe 529 to pipe 453 and sphere 454. The bottoms flow from depropanizer 528 through line 530 to primary re-run tower 531 from which a gasoline cut of improved octane rating is taken overhead through line 532 to storage 536.

The bottoms of primary re-run tower 531 flows through line 533 to secondary re-run tower 534 from which a gasoline cut of improved octane rating is taken overhead through line 535 to storage 536.

The bottoms of secondary re-run tower 534 flows through line 537 to storage 538.

It will be observed that in the application of the principles of the present invention to a split feed reformer as illustrated in Figure 3, carbon monoxide is introduced in zone "U" only in concentrations of about 0.2 to about 25, preferably 0.5 to 10 mol per cent while the gaseous reactants of zone "L" are substantially devoid of carbon monoxide.

To establish a satisfactory heat balance water in a drum not shown flows through pipe 539. A portion is bled off to the coils of the regenerator not shown and the balance flows to pipe 547 to a coil in heater 498 where steam is produced. The steam so produced flows through pipe 548 to pipe 546. The balance of the water in pipe 539 flows in part through pipe 540 under control of valve 541, through heat exchanger 553 and pipe 544 back to the aforesaid drum. A part flows through pipe 542 under control of valve 543 to heat exchanger 506 and pipe 544 back to the aforesaid drum. The balance flows through heater 522 and pipe 546 back to the aforesaid drum.

From the foregoing descriptions of the present invention it will be manifest that, in general, the present invention provides for introducing untreated active reforming catalyst, i. e., catalyst which has not been treated with hydrogen, carbon monoxide, etc., into a reformer or reactor and reforming a hydrocarbon reactant in contact with said catalyst in the presence of carbon monoxide introduced into the reaction zone of the reformer, such that about 0.05 to about 1 cubic foot of carbon monoxide is consumed per pound of untreated catalyst. More particularly, about 0.2 of a cubic foot to about 11.0 cubic feet of carbon monoxide per pound of untreated catalyst present in the reaction zone is added to the recycle gas such that a carbon monoxide to carbon dioxide ratio of $$\frac{T°F.-700}{50} \text{ to } \frac{T°F.-700}{10}$$

where T° F. is the vapor temperature at the reactor outlet, is present in the vapors removed from the reaction zone. Furthermore, the moisture content of the reaction zone gases and/or vapors as measured at the vapor outlet of the reactor is less than about 0.7 mol per cent and preferably less than about 0.2 mol per cent. In addition, the concentration of carbon dioxide in the effluent gases from the reactor is less than about 0.6 to about 1.0 and preferably less than about 0.2 to about 0.5 mol per cent.

I claim:

1. In the method of reforming hydrocarbons comprising introducing into a reforming zone under reforming conditions of temperature and pressure a reformable hydrocarbon reactant, hydrogen-containing gas in an amount sufficient to provide a hydrogen partial pressure greater than one atmosphere and particle form solid reforming catalyst in the presence of which catalyst the moisture content of the gaseous and vaporous effluent from said reforming zone is increased to at least 0.7 mol per cent, the improvement which comprises introducing into said reforming zone wherein the hydrogen partial pressure is greater than one atmosphere sufficient carbon monoxide to produce a gaseous and vaporous reforming zone effluent comprising less than about 0.7 mol per cent moisture, less than about 1.0 mol per cent carbon dioxide, about 0.2 to about 25 mol per cent carbon monoxide and having a carbon monoxide to carbon dioxide ratio of about 2 to about 300 as defined by the ratio:

$$\frac{T°F.-700}{50} \text{ to } \frac{T°F.-700}{10}$$

where T° F. is the vapor temperature at the outlet of said reforming zone.

2. In the method of reforming hydrocarbons wherein a reformable hydrocarbon reactant and a hydrogen-containing gas are introduced into a reforming zone at reforming conditions of temperature and pressure in a ratio to provide a hydrogen partial pressure in excess of one atmosphere, wherein particle form solid reforming catalyst is introduced into and withdrawn from said reforming zone, and wherein in the presence of said reforming catalyst the moisture content of the gaseous and vaporous effluent from said reforming zone is increased to at least 0.7 mol per cent the improvement which comprises introducing carbon monoxide into said reforming zone in which the hydrogen partial pressure is greater than one atmosphere at the rate of about 0.05 to about 1 cubic foot of carbon monoxide per pound of said catalyst introduced into said reforming zone and in an amount sufficient to provide a gaseous and vaporous reforming zone effluent containing less than 0.7 mol per cent moisture and having a carbon monoxide to carbon dioxide ratio of about 2 to about 300 as defined by the ratio $$\frac{T°F.-700}{50} \text{ to } \frac{T°F.-700}{10}$$

where T° F. is the temperature of the gaseous and vaporous reforming zone effluent at the outlet of said reforming zone.

3. In the method of reforming hydrocarbons wherein a reformable hydrocarbon reactant and a hydrogen-containing gas in the ratio of about 1 to about 8 moles of hydrogen per mol of said hydrocarbon reactant are introduced into a reforming zone at reforming conditions of temperature and pressure, wherein the hydrogen partial pressure in said reforming zone is greater than one atmosphere, wherein particle form solid reforming catalyst is introduced into and withdrawn from said reforming zone, and wherein in the presence of said solid reforming catalyst the moisture content of the gaseous and vaporous effluent from said reforming zone is increased to at least 0.7 mol per cent, the improvement which comprises introducing carbon monoxide into said reforming zone wherein the hydrogen partial pressure is greater than one atmosphere at the rate of about 0.05 to about 1 cubic foot of carbon monoxide per pound of said catalyst introduced into said reforming zone and sufficient to provide a gaseous and vaporous reforming zone effluent containing less than 0.7 mol per cent moisture, less than about 0.6 to 1.0 mol per cent carbon dioxide and about 0.2 to about 25 mol per cent carbon monoxide.

4. The improvement in the method of reforming hydrocarbons as set forth in claim 3 wherein the particle form solid reforming catalyst, in the presence of which the moisture content of said gaseous and vaporous reforming zone effluent is increased to at least 0.7 mol per cent, comprises at least 70 mol per cent alumina, balance, at least 18 mol per cent chromia.

References Cited in the file of this patent

UNITED STATES PATENTS

| | | |
|---|---|---|
| 2,345,128 | Korpi | Mar. 28, 1944 |
| 2,349,045 | Layng et al. | May 16, 1944 |
| 2,500,482 | Barter | Mar. 14, 1950 |
| 2,578,704 | Houdry | Dec. 18, 1951 |
| 2,656,304 | McPherson et al. | Oct. 20, 1953 |